United States Patent [19]

Modern et al.

[11] Patent Number: 5,574,225
[45] Date of Patent: Nov. 12, 1996

[54] APPARATUS AND A METHOD FOR DETECTING THE POSITION OF A LASER BEAM

[75] Inventors: Peter J. Modern, Preston; William O'Neill, Liverpool; Martin R. Sparkes, Macclesfield; William M. Steen, Cadley, all of United Kingdom

[73] Assignee: British Nuclear Fuels plc, Warrington, United Kingdom

[21] Appl. No.: 262,217

[22] Filed: Jun. 20, 1994

[30] Foreign Application Priority Data

Jun. 18, 1993 [GB] United Kingdom ............... 9312584

[51] Int. Cl.⁶ .................................................. G01J 1/56
[52] U.S. Cl. ................... 73/643; 73/602; 250/342; 250/370.1; 356/121
[58] Field of Search .................... 73/643, 602; 356/5, 356/121; 250/342, 234, 370.1, 203.1

[56] References Cited

U.S. PATENT DOCUMENTS

| | | | |
|---|---|---|---|
| 3,585,392 | 1/1971 | Korpel | 250/199 |
| 4,067,015 | 1/1978 | Mogavero et al. | 343/225 |
| 4,126,047 | 11/1978 | Sethares et al. | 73/505 |
| 4,513,749 | 4/1985 | Kino et al. | 73/597 |
| 4,543,486 | 9/1985 | Rose | 73/643 |

FOREIGN PATENT DOCUMENTS 2158942  11/1985  United Kingdom.

*Primary Examiner*—Hezron E. Williams
*Assistant Examiner*—Helen C. Kwok
*Attorney, Agent, or Firm*—Nixon & Vanderhye P.C.

[57] ABSTRACT

In a method of detecting the spatial position of a laser beam relative to a body locatable in the path of the laser beam by detecting an acoustic signal produced by the beam in the body, wherein the laser beam carries a power modulation signal and the body has a plurality of acoustic sensors for detecting the acoustic signal produced in the body by the laser beam, the method includes detecting in the outputs of the acoustic sensors signals corresponding to the power modulation of the incident laser beam and detecting any difference in phase between the detected signals. A processor may be provided for processing the outputs of the acoustic sensors, the processor including a sensor for sensing in the respective outputs signals corresponding to the power modulation of the output beam of the laser and a phase sensitive detector for detecting differences in phase between the detected signals. There may be at least three acoustic sensors whereby the spatial position of the laser beam may be detected in two dimensions.

16 Claims, 4 Drawing Sheets

APPARATUS AND A METHOD FOR DETECTING THE POSITION OF A LASER BEAM

BACKGROUND OF THE INVENTION

1. Field of the Invention

The present invention relates to an apparatus and a method for detecting the position of a laser beam.

2. Discussion of the Prior Art

In systems employing laser beams it is desirable in some applications to be able to change the direction of the beam using one or more mirrors. In some cases it is necessary to be able to measure the position of the beam accurately relative to a datum point on the mirror.

Previously reported research has shown that acoustic waves are produced when a laser beam is incident upon a mirror employed to deflect the beam. These signals have been attributed to thermal absorption in a thin surface of the mirror. Owing to thermal expansion a pressure is exerted in the surrounding area. The thermal energy is deposited so rapidly by the beam that the adjacent material has no time to relax, and hence quench the acoustic wave. The laser beam thus acts as a source of elastic waves on the surface of the mirror.

It has been suggested in the prior art that the acoustic signal produced by a laser beam in a reflector may be used to detect a predetermined characteristic of the beam, particularly the beam power. For example, prior patent specification GB 2158942A describes such an arrangement in which the acoustic signal is proposed to be picked up by an electromechanical transducer mounted on a beam reflector. However, no practical application of this idea has been made hitherto because no practical way has been proposed of putting it into effect.

SUMMARY OF THE INVENTION

According to the present invention there is provided a method of detecting the spatial position of a laser beam relative to a body located in the path of the beam by detecting an acoustic signal produced by the beam in the said body, wherein the laser beam carries a power modulation signal and the body has a plurality of acoustic sensors for detecting the acoustic signal produced in the body by the laser beam, the method including detecting in the outputs of the acoustic sensors signals corresponding to the power modulation of the incident laser beam and detecting any difference in phase between the detected signals.

According to the present invention in a second aspect there is provided an apparatus for detecting the position of a laser beam relative to a body locatable in the path of the laser beam, including a laser having in use an output beam carrying a power modulation signal, a body locatable in the path of the laser beam the body having a plurality of acoustic sensors for detecting an acoustic signal produced by the laser beam in the body and a processor for processing the outputs of the acoustic sensors, the processor including means for sensing in the respective outputs signals corresponding to the power modulation of the output beam of the laser and a phase sensitive detector for detecting differences in phase between the detected signals.

Desirably, there are at least three acoustic sensors whereby the spatial position of the laser beam may be detected in two dimensions relative to the said body.

The difference in phase between the signals detected by the acoustic sensors provides a measure of the spatial position of the laser beam relative to a datum point on the body. For example, if the datum point is at the centre of the body and the acoustic sensors are located equidistantly from the datum point then when the axis of the laser beam co-incides with the datum point the detected signals will be in-phase. There is a time delay between incidence of the beam on the body and reception of the corresponding acoustic signal at the acoustic sensors. The time delays are equal if the distances travelled by the acoustic signal to the respective acoustic sensors are equal. However, when the laser beam moves off-axis toward one or more of the acoustic sensors there will be a difference in delay of the acoustic signal reaching the respective sensors and this difference in delay produces a phase difference between the detected signals.

The modulation of the laser beam power is desirably at a frequency greater than 1 kHz. The modulation may be obtained by applying a suitable modulation waveform to the power applied to energise the laser from its power control unit or system. Alternatively, a natural fluctuation in the laser output may be employed. Such fluctuations occur at frequencies characteristic of the type of laser employed.

The laser may be a carbon dioxide laser or other gas laser, an excimer laser or a solid state laser eg Nd-YAG.

The processor may include filter means adapted to filter the output of each acoustic sensor and a phase detector means adapted to compare the phase of each filtered output with a reference phase.

The filter means may comprise a plurality of matched filters each associated with one of the acoustic sensors. The matched filters in use having reference signals inputs relating to the modulation of the laser output power. The reference signal may be supplied from a power control system controlling the power supply and modulation therein applied to the laser.

The phase detector means may comprise a phase lock circuit of a known kind providing in use a dc signal which is a measure of the relative phase of its input. A plurality of phase lock circuits may be employed each associated with one of the said filters whereby it has an input the output of the corresponding filter.

The respective outputs of the phase lock circuits may be compared by a comparator device. The comparator device may comprise an analogue to digital converter for converting each output from the phase lock circuits into a digital value and a digital computer for detecting differences between the respective digital values, eg differences above a given threshold.

The said comparator device may be adapted to produce an error control signal which via a feedback loop and a servo-control mechanism adjusts the position of the mirror until the print of the laser beam on the mirror is such that the difference between the outputs of the phase lock circuits is substantially eliminated.

The acoustic sensors may for example be piezoelectric or other known transducers which can convert acoustic signals into electrical signals.

The present invention has particular applicability in uses in which a laser beam has to be transmitted from a laser source to a remote point of application. For example, the point of application may be in a building in which remote handling operations are carried out, eg for treatment of contaminated surfaces as described in Applicants' EP 0574564 (PCT/GB/9209404). In such uses the laser beam may be steered by a plurality of mirrors as aforesaid each having its own acoustic sensors and detection system providing control signals for adjusting the orientation of the mirror. For example, when the building in which the laser system is employed is the subject of a seismic disturbance or other vibration, the apparatus according to the present invention will allow automatic adjustment of the mirrors to keep the point of application of the laser beam the same.

BRIEF DESCRIPTION OF THE DRAWINGS

Embodiments of the present invention will now be described by way of example with reference to the accompanying drawings, in which.

DETAILED DISCUSSION OF PREFERRED EMBODIMENTS

Figure 1:
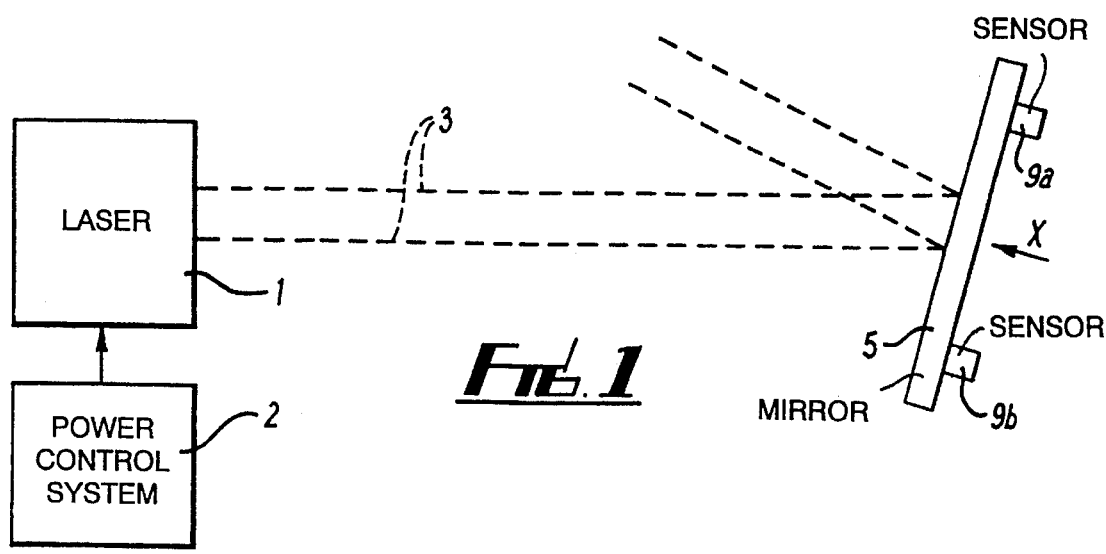
FIG. 1 is a side view of a laser arranged to irradiate a beam position detection mirror.
Figure 2:
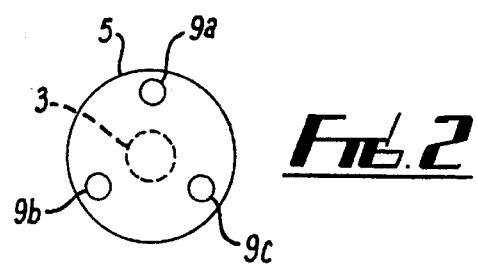
FIG. 2 is an end view in the direction 'X' of the detector mirror shown in FIG. 1.

As shown in FIG. 1, a laser 1 energised by a power control system 2 produces an output laser beam 3 which is incident on a detector mirror 5. The beam 3 on reflection by the mirror is deflected toward an application system not shown. In practice, the angle between the normal to the mirror 5 and the beam 3 may be very small whereby the beam 3 makes an approximately circular print on the mirror 5.

The mirror 5 has deposited on its rear surface (relative to incidence of the beam 3) three acoustic sensors 9a, 9b, 9c each of which is acoustically coupled to the rear surface of the mirror 3 by high vacuum grease and is independently clamped (by a clamp not shown). The rear surface of the mirror 3 on which the sensors 9a, 9b and 9c are located may optionally comprise the outside surface of a cooled water jacket provided at the rear of the mirror 3.

The sensors 9a, 9b and 9c may be wide band acoustic sensors which comprise finely tuned piezoelectric crystals. Each of the sensors 9a, 9b, 9c picks up the acoustic signal produced in the mirror 5 by the beam 3.

Figure 3:
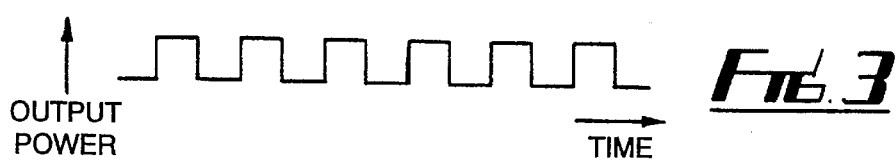
FIG. 3 is a graph illustrating an idealised modulation wave form of the output power of the laser shown in FIG. 1.

The laser 1 is controlled by the control system 2 by application of a waveform which varies according to a square wave modulation function. This produces a power output waveform comprising the beam 3 which in an idealised form is as illustrated in FIG. 3. Alternatively, the beam power may be modulated as shown in idealised form in FIG. 4 wherein part of the waveform carries a double pulse P or as shown in idealised form in FIG. 5 wherein the modulation occurs only occasionally, eg 100 times per second, between times $t_{ON}$ and $t_{OFF}$.

Figure 6:
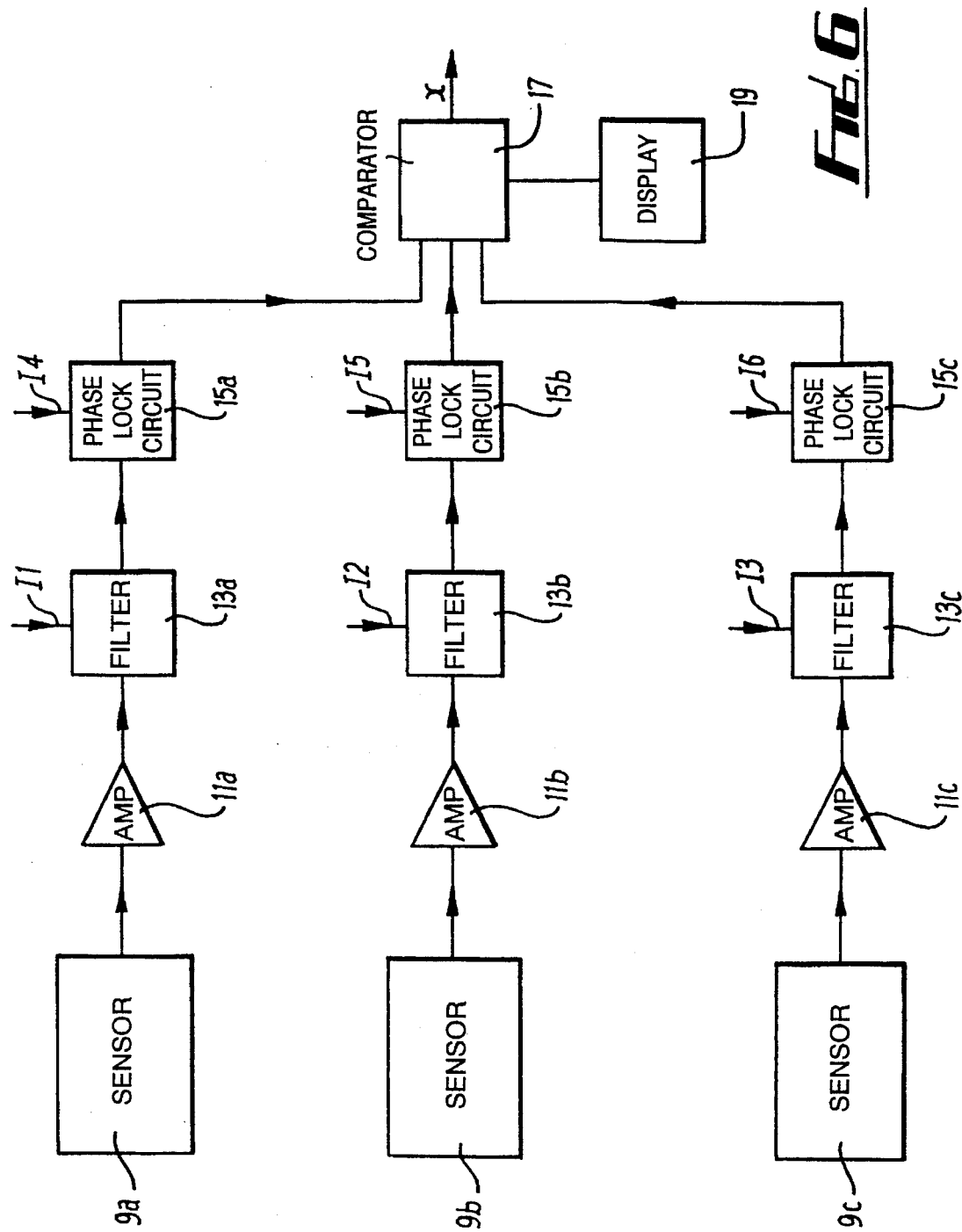
FIG. 6 is a block circuit diagram showing a signal processing arrangement for signals produced by the acoustic detectors located on the detection mirror shown in FIG. 1.

FIG. 6 shows how the acoustic signals produced by the beam 3 are detected and processed. The output of the acoustic sensors 9a, 9b and 9c are fed respectively into amplifiers 11a, 11b and 11c and then into matched filters 13a, 13b, 13c having reference inputs I1, I2 and I3 comprising a common waveform obtained from a waveform generator incorporated within the power control system 2 (FIG. 1). The outputs of the filters 13a, 13b and 13c are applied respectively to phase lock circuits 15a, 15b and 15c having reference inputs I4, I5 and I6 comprising a common reference waveform of known phase obtained from a clock incorporated within the control system 2 (FIG. 1).

Figure 7:
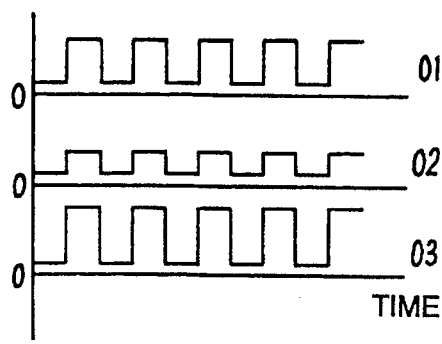
FIG. 7 is a graph showing idealised signals detected by the acoustic detectors shown in FIG. 1 when in-phase.
Figure 8:
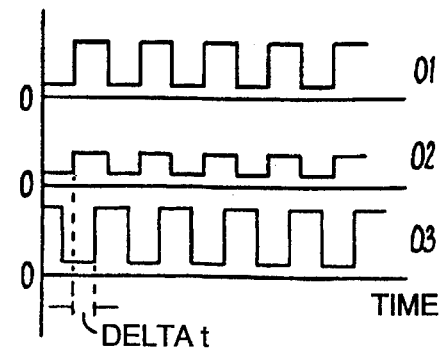
FIG. 8 is a graph showing a phase difference in idealised signals detected by the acoustic detectors shown in FIG. 1.

FIGS. 7 and 8 illustrate idealised outputs 01, 02 and 03 obtained from the sensors 9a, 9b and 9c for a waveform as shown in FIG. 3 applied by the power control system 2 to the laser 1. If the beam 3 is incident on the mirror 5 equidistantly from the sensors 9a, 9b and 9c then, as shown in FIG. 7, all of the outputs 01, 02 and 03 are in phase with the output waveform of the power control system 2. If the beam 3 is incident on the mirror 5 in a position which is nearer to the sensor 9c than to the sensors 9a and 9b then there is a phase difference 'delta t' as shown by dashed lines in FIG. 8 between the phase of the output 03 which represents the signal detected by the sensor 9c and the outputs 01 and 02 representing signals detected by the sensors 9a, 9b which are by design arranged to be in turn in-phase with the output waveform of the power control circuit 2.

Figure 10:
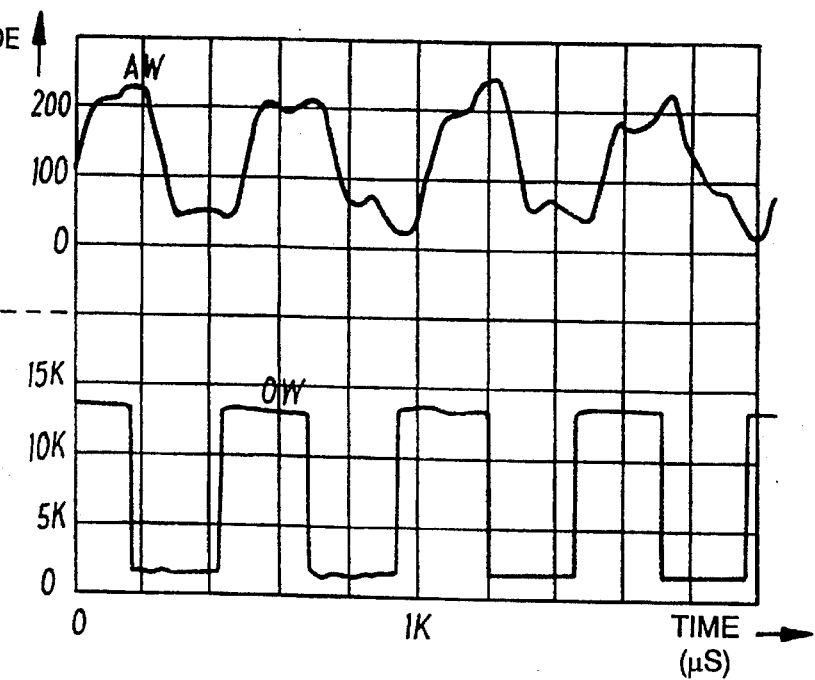
FIG. 10 is a graph showing the shape of the acoustic waveform.
Figure 9:
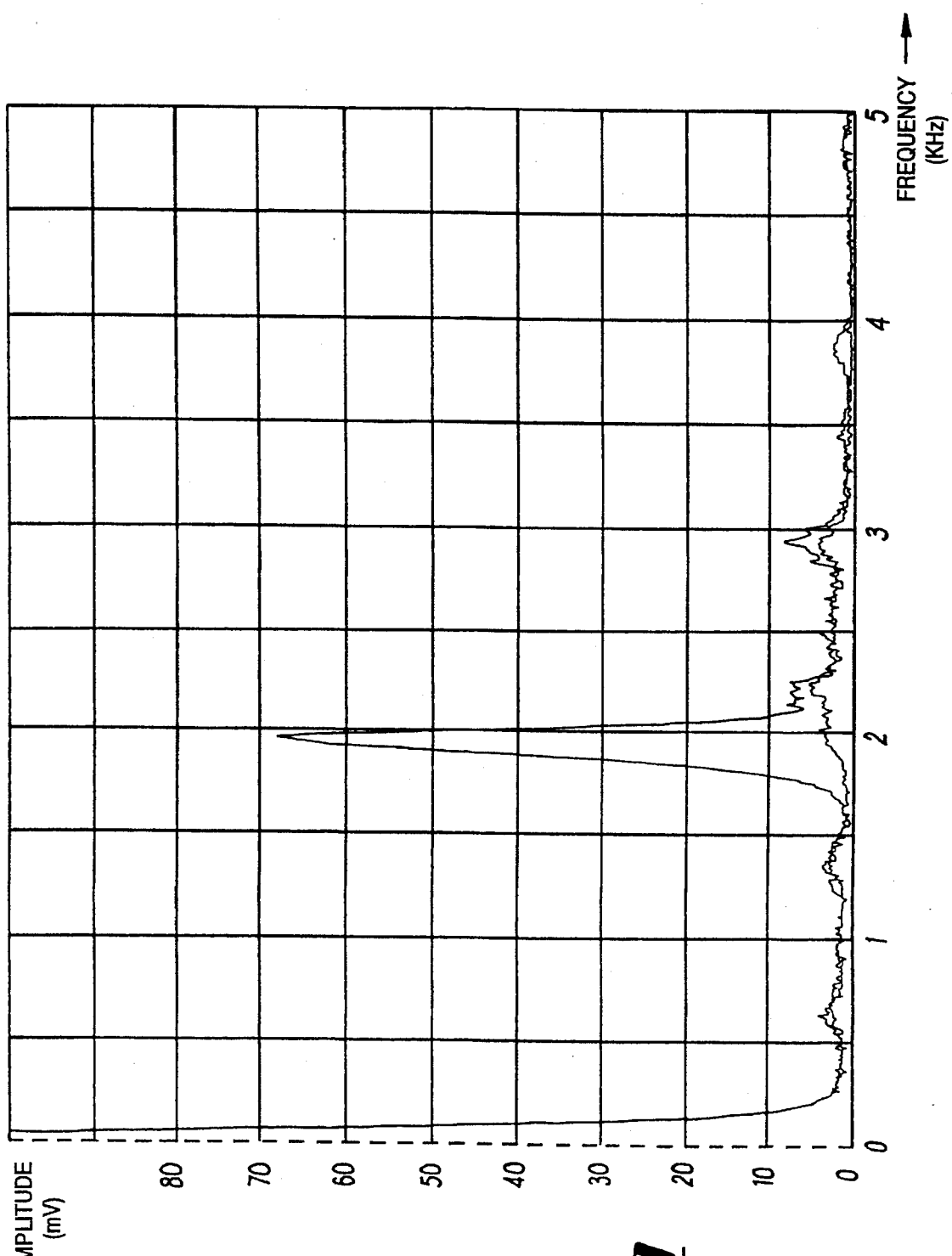
FIG. 9 is a graph of the acoustic frequency spectrum.

In practice, the signals provided as outputs by the acoustic sensors 9a, 9b and 9c are not idealised as shown in FIGS. 7 and 8 since there is a frequency spread in the output for a given input. FIG. 9 illustrates the acoustic frequency spectrum obtained when a 100 per cent 1 kW, 2 kHz square wave modulation is applied to an Electrox laser the output beam 3 of which is detected by the sensor 9a. FIG. 10 illustrates the shape of the acoustic waveform AW obtained for the same laser modulation. The laser modulation is obtained from the waveform OW shown in FIG. 10 which is the output of the power control circuit 2. The outputs of the sensors 9a, 9b and 9c are cleaned by the matched filters 11a, 11b and 11c to facilitate phase detection in the phase lock circuits 13a, 13b and 13c respectively.

Each phase lock circuit 15a, 15b and 15c shown in FIG. 6 produces a dc output voltage which is a measure of the relative phase of its input signal as determined by reference to the inputs I4, I5 and I6.

The circuits 15a, 15b and 15c are normalised with respect to one another so that given changes in output voltage represent the same given measured phase difference. When the respective outputs of the circuits 15a, 15b and 15c are equal, therefore, there is known to be no phase difference between the signals detected by the three sensors 9a, 9b and 9c and the beam 3 is therefore positioned equidistantly between the sensors 9a, 9b and 9c. If one of the outputs of the circuits 15a, 15b and 15c differs from its expected value this indicates that relative adjustment is needed between the position of the beam 3 and the mirror 5. The outputs of the circuits 15a, 15b and 15c are applied to a comparator 17 which detects differences above a threshold in magnitude between its three inputs. The comparator 17 may comprise an analogue-to-digital converter which converts the input voltages into digital values and a digital computer which carries out the comparison procedure. The result of the comparison procedure by the comparator 17 may be displayed on a visual display 19, eg oscilloscope, and an error control signal output x generated by the comparator 17 may be applied in a known way via a servo-loop and servo-control mechanism (not shown) to adjust mirror 5 relative to the position of the beam 3 so that the outputs of the circuits 15a, 15b and 15c are equal.

Figure 4:
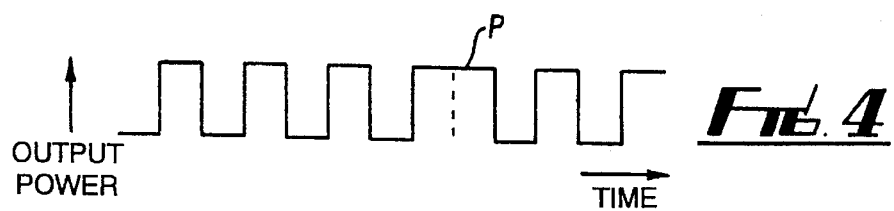
FIG. 4 is a graph illustrating an alternative laser output idealised modulation waveform.
Figure 5:
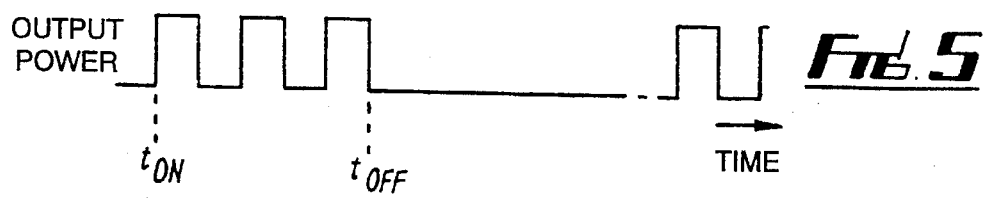
FIG. 5 is a graph illustrating a further alternative laser output modulation waveform.

The waveforms shown in FIGS. 4 and 5 are examples of alternative waveforms which may be employed to simplify the phase locking procedure.

We claim:

1. A method of detecting the spatial position of a laser beam relative to a body locatable in a path of the laser beam by detecting an acoustic signal produced by the laser beam in the body, wherein the laser beam includes a power modulation signal and the body has a plurality of acoustic sensors for detecting and producing an output indicative of the acoustic signal produced in the body by the laser beam, the method including the steps of:

detecting, in the outputs of the acoustic sensors, signals corresponding to the power modulation signal of the laser beam; and detecting any difference in phase between the detected signals, said detected phase difference indicative of the spatial position of the laser beam relative to said body.

2. An apparatus for detecting the position of a laser beam relative to a body located in a path of the laser beam said laser beam including a power modulation signal in said laser beam, the apparatus comprising:

a plurality of acoustic sensors mounted on said body for detecting and producing an output indicative of an acoustic signal produced by the laser beam in the body; and a processor for processing the outputs of the acoustic sensors, the processor including:

means for sensing, in the respective acoustic outputs, signals corresponding to the power modulation signal of the laser beam; and a phase sensitive detector for detecting differences in phase between the outputs of said acoustic sensors, said detected phase difference position of the laser beam relative to said body.

3. A method as in claim 1 and wherein there are at least three acoustic sensors and said method includes the step of detecting the spatial position of the laser beam in two dimensions.

4. A method as in claim 1 and wherein the power modulation signal of the laser beam is at a frequency greater than 1 kHz.

5. A method as in claim 4 and wherein the power modulation signal is obtained by applying a modulation waveform to power applied to said laser to modulate the laser beam with the power modulation signal.

6. A method as in claim 4 and wherein said power modulation signal is comprised of a natural fluctuation in the laser beam, the fluctuation occurring at a frequency characteristic of the laser beam employed.

7. Apparatus as in claim 2 and wherein said processor includes filter means adapted to filter the output of each of said acoustic sensors and said phase sensitive detector comprises a means for comparing the phase of each filtered output with a reference phase.

8. Apparatus as in claim 7 and wherein said filter means comprises a plurality of matched filters, each of said matched filters associated with one of the acoustic sensors, the matched filters having as reference signals an input relating to the power modulation signal of the laser beam.

9. Apparatus as in claim 2, and wherein said phase sensitive detector comprises a phase lock circuit providing a dc signal output which is a measure of relative phase of the acoustic outputs.

10. Apparatus as in claim 7 and wherein said filter means comprises a plurality of matched filters, each matched filter associated with one of the acoustic sensors, the matched filters having input reference signals relating to the power modulation signal of the laser beam and wherein a plurality of phase lock circuits are included, each phase lock circuit having an output and associated with one of said filters, whereby the output of the corresponding filter is an input to the corresponding phase lock circuit.

11. Apparatus as in claim 10 and wherein said means for comparing comprises a comparator device for comparing the corresponding outputs of the phase lock circuits.

12. Apparatus as in claim 11 and wherein the comparator device comprises an analogue-to-digital converter for converting each of said outputs from the phase lock circuits into a digital value and a digital computer for detecting differences between the digital values above a given threshold.

13. Apparatus as in claim 12 and wherein said comparator device is adapted to produce an error control signal and the apparatus includes a feedback loop and a servo-control mechanism connected thereto to adjust by the error control signal the position of the laser beam until the difference between the outputs of the phase lock circuits is substantially eliminated.

14. Apparatus as in claim 2 wherein the acoustic sensors are piezoelectric transducers which can convert acoustic signals into electrical signals.

15. A method of detecting the spatial position of a laser beam relative to a mirror locatable in a path of the laser beam by detecting an acoustic signal produced by the laser beam in the mirror, wherein the laser beam includes a power modulation signal and the mirror has a plurality of acoustic sensors for detecting and producing an output indicative of the acoustic signal produced in the mirror by the laser beam, the method including the steps of:

detecting, in the outputs of the acoustic sensors, signals corresponding to the power modulation signal of the laser beam; and detecting any difference in phase between the detected signals, said detected phase difference indicative of the spatial position of the laser beam relative to said mirror.

16. An apparatus for detecting the position of a laser beam relative to a mirror located in a path of the laser beam, said laser beam including a power modulation signal in said laser beam, the apparatus comprising:

a plurality of acoustic sensors mounted on said mirror for detecting and producing an output indicative of an acoustic signal produced by the laser beam in the mirror; and a processor for processing the outputs of the acoustic sensors, the processor including:

means for sensing, in the respective acoustic outputs, signals corresponding to the power modulation signal of the laser beam; and a phase sensitive detector for detecting differences in phase between the outputs of said acoustic sensors, said detected phase difference indicative of the spatial position of the laser beam relative to said mirror.

* * * * *

UNITED STATES PATENT AND TRADEMARK OFFICE
CERTIFICATE OF CORRECTION

PATENT NO. : 5,574,225
DATED : November 12, 1996
INVENTOR(S) : MODERN et al.

It is certified that error appears in the above-indentified patent and that said Letters Patent is hereby corrected as shown below:

Col. 5, line 41, after "difference" insert --indicative of the spatial--.

Signed and Sealed this

Fifteenth Day of April, 1997

Attest:

BRUCE LEHMAN

Attesting Officer     Commissioner of Patents and Trademarks